(12) United States Patent
Kim et al.

(10) Patent No.: US 7,745,046 B2
(45) Date of Patent: Jun. 29, 2010

(54) SECONDARY BATTERY

(75) Inventors: Yong-Sam Kim, Suwon-si (KR); Hyon-Sok Kim, Suwon-si (KR)

(73) Assignee: Samsung SDI Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 1241 days.

(21) Appl. No.: 11/156,609

(22) Filed: Jun. 21, 2005

(65) Prior Publication Data
US 2005/0287430 A1 Dec. 29, 2005

(30) Foreign Application Priority Data
Jun. 29, 2004 (KR) .................... 10-2004-0049295

(51) Int. Cl.
H01M 2/02 (2006.01)
H01M 2/18 (2006.01)
H01M 6/12 (2006.01)
H01M 6/46 (2006.01)

(52) U.S. Cl. ................. 429/178; 429/136; 429/137; 429/162; 429/179

(58) Field of Classification Search ............ 429/136, 429/137, 162, 178, 179
See application file for complete search history.

(56) References Cited

U.S. PATENT DOCUMENTS

| 4,292,381 A | | 9/1981 | Klein | |
|---|---|---|---|---|
| 6,027,831 A | * | 2/2000 | Inoue et al. | 429/181 |
| 2001/0049054 A1 | * | 12/2001 | Enomoto et al. | 429/158 |

FOREIGN PATENT DOCUMENTS

| CN | 1366360 | 8/2002 |
|---|---|---|
| JP | 2000-150306 A | 5/2000 |
| JP | 2002-008708 | 1/2002 |
| JP | 2003-7346 | 1/2003 |
| JP | 2004-111300 | 4/2004 |

* cited by examiner

Primary Examiner—Patrick Ryan
Assistant Examiner—Julian Mercado
(74) Attorney, Agent, or Firm—Robert E. Bushnell, Esq.

(57) ABSTRACT

A secondary battery includes: an electrode assembly including positive and negative electrodes; a container adapted to receive the electrode assembly; a cap assembly having at least two terminals exposed outside the container, the cap assembly being adapted to be fixed to the container to seal the container; and lead elements adapted to electrically connect the terminals and the electrode assembly. A center of the terminals are aligned with a center of the electrode assembly, and the lead elements are spaced apart from the center of their respective terminals and adapted to be connected to their respective terminals and the electrode assembly.

18 Claims, 5 Drawing Sheets

SECONDARY BATTERY

CLAIM OF PRIORITY

This application makes reference to, incorporates the same herein, and claims all benefits accruing under 35 U.S.C. §119 from an application for SECONDARY BATTERY earlier filed in the Korean Intellectual Property Office on 29 Jun. 2004 and there duly assigned Ser. No. 10-2004-0049295.

BACKGROUND OF THE INVENTION

1. Field of the Invention

The present invention relates to a secondary battery, and more particularly, to an assembly structure of an electrode assembly, a terminal and a lead element of a secondary battery.

2. Description of the Related Art

Depending on the use or the power capacity of the battery, the secondary batteries can be classified into low power batteries (hereinafter referred to as "small batteries") in which one to several battery cells are combined into a battery pack, and bulk size batteries for driving motors (hereinafter referred to as "large batteries") in which several to tens of secondary battery cells are connected to form a battery pack.

Small batteries are used as the power source for various portable electronic devices, such as cellular phones, laptop computers, and camcorders. Large batteries are suitable for the power source of motor driven devices, such as hybrid electric vehicles.

Generally, small batteries have square and cylindrical shapes, when they are have only one cell. The small battery includes an electrode assembly in which a separator, serving as an insulator, is interposed between a positive plate and a negative plate of a belt shape. The separator and both plates are then spiral-wound. The electrode assembly is inserted into a cylindrical container to form the battery.

Conductive lead elements, which pass the current produced when the battery is operated, are attached to the positive and negative electrodes. The lead elements pass the current produced from the positive and negative electrodes to the positive and negative terminals.

When the above structure of the small battery is applied to the large battery, the dynamic kinetics necessary for large batteries are not satisfied in terms of capacity and power. Accordingly, secondary batteries have been provided including the multi-tap structure disclosed in Japanese Laid-open Patent No. 2003-7346 in which plural taps are attached to the electrode assembly. This secondary battery has a plurality of taps formed on the electrode assembly along one direction of the electrode assembly, and the taps are connected to external terminals.

However, such a multi-tap structure has a problem that needs a large workforce. Since a unit area of the tap in the tap type current collection structure is small, the battery has the limitation that it cannot satisfy the power characteristics required for the large battery.

Furthermore, considering the dynamic kinetics, since the large secondary battery needs a high energy density per unit volume, when the electrode assembly is mounted inside the container, it is necessary for the space between the electrode assembly and the container to be reduced as much as possible. This can maximize the volume of the electrode assembly occupying the inner space of the container having a fixed volume, thereby improving the capacity of the secondary battery.

However, when the electrode assembly is mounted inside the container, it is unavoidable for a gap between the electrode assembly and the container to be formed. This is caused by the tolerance of the manufacturing process and by the volume of the lead elements occupying the container not being reduced in size due to the structural limitations of the lead elements connected to the electrode assembly.

SUMMARY OF THE INVENTION

An object of the present invention is to provide a secondary battery in which the connection structure of the electrode assembly with the lead elements electrically connected thereto is improved to reduce the gap inside the container.

According to one aspect of the present invention, a secondary battery is provided comprising: an electrode assembly including positive and negative electrodes; a container adapted to receive the electrode assembly; a cap assembly having at least two terminals exposed outside the container, the cap assembly being adapted to be fixed to the container to seal the container; and lead elements adapted to electrically connect the terminals and the electrode assembly; wherein a center of the terminals are aligned with a center of the electrode assembly, and wherein the lead elements are spaced apart from the center of their respective terminals and adapted to be connected to their respective terminals and the electrode assembly.

The positive electrode and the negative electrode preferably respectively have uncoated regions lacking active material, and the terminals and the lead elements are preferably respectively connected to the positive uncoated region and the negative uncoated region.

The positive uncoated region and the negative uncoated region are preferably adapted to be arranged opposite to each other, and the lead elements are preferably adapted to respectively attach to an outermost portion of the positive uncoated region and an outermost portion of the negative uncoated region.

Each lead element is preferably adapted to contact and attach to its respective uncoated region along the length direction of the uncoated region.

The outermost portions of the positive uncoated region and the negative uncoated region are preferably adapted to be opposite to each other, and the positive lead element and the negative lead element are preferably adapted to contact and attach to at least one of the outermost portions.

Each terminal is preferably adapted to be inserted into a hole on a base plate of the cap assembly, and a stop protrusion is preferably arranged between each terminal and its respective lead element to connect the terminal and the lead element and to stop the terminal at the base plate.

A gasket is preferably arranged between each terminal and the base plate and is preferably adapted to respectively insulate each terminal from the base plate.

A screw thread is preferably adapted to mate with a nut arranged on an outer circumference surface of each terminal to fix each terminal to the base plate.

The secondary battery preferably has a rectangular shape.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE INVENTION

Reference will now be made in detail to the embodiments of the present invention, examples of which are illustrated in the accompanying drawings.

Figure 1:
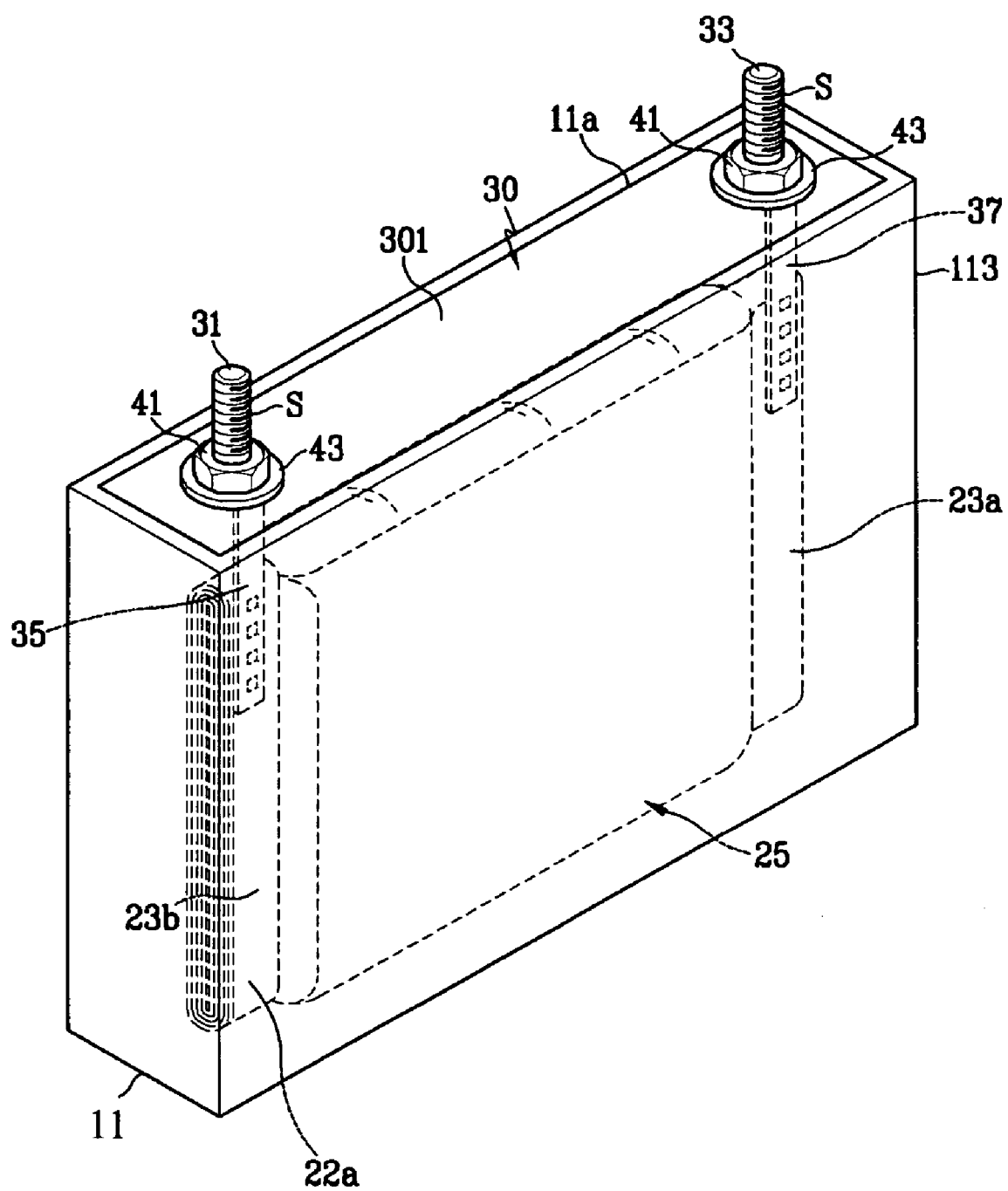
FIG. 1 is a perspective view of a secondary battery according to a first embodiment of the present invention.
Figure 2:
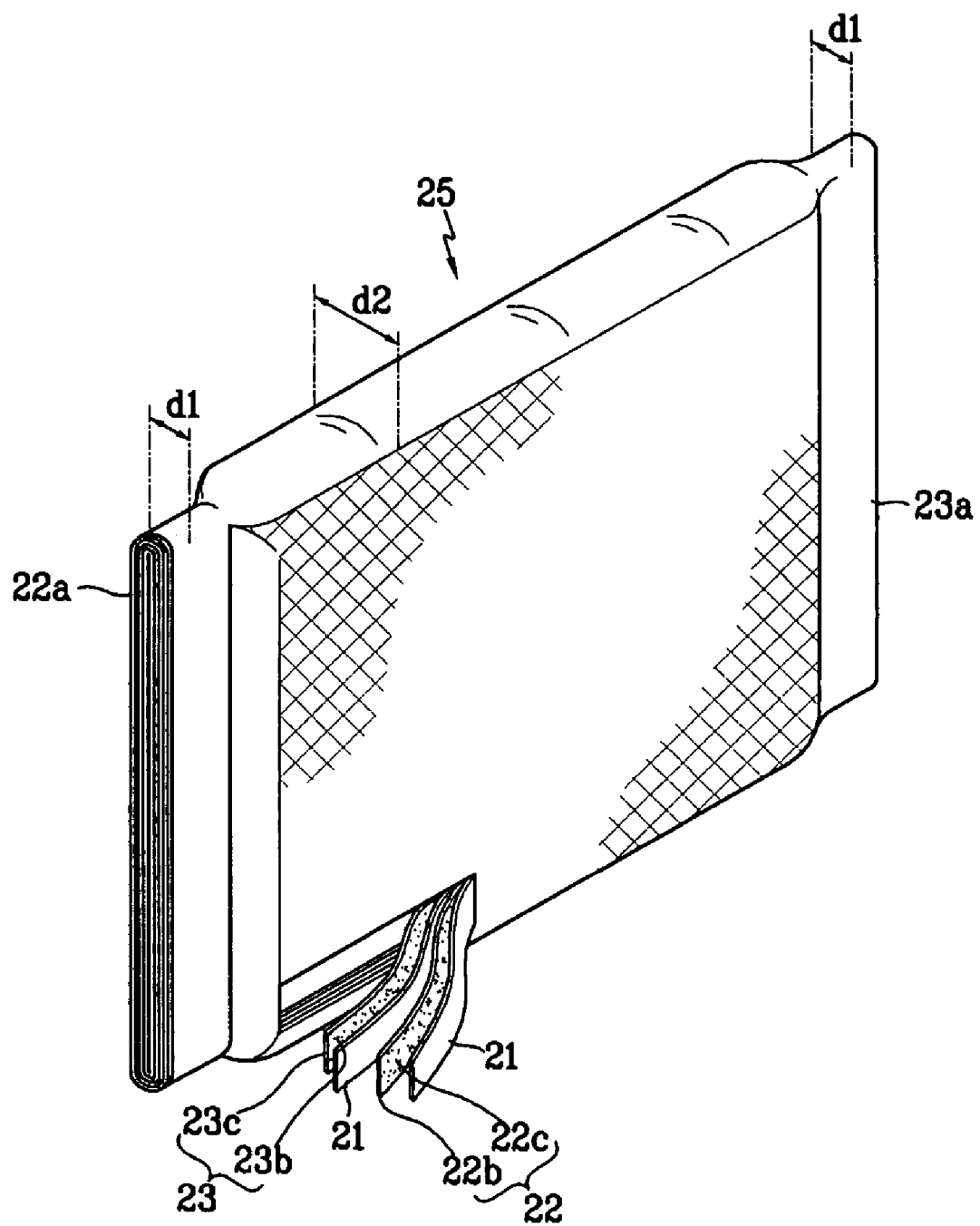
FIG. 2 is a perspective view of an electrode assembly according to the first embodiment of the present invention.

FIG. 1 is a perspective view of a secondary battery according to a first embodiment of the present invention, and FIG. 2 is a perspective view of an electrode assembly according to the first embodiment of the present invention.

As shown in the drawings, the secondary battery according to the present embodiment is a rectangular battery, which comprises a container 11 with a hexahedral shape having an opening, an electrode assembly 25 to be arranged in the container, the assembly 25 including a positive electrode 22, a negative electrode 23, and a separator 21 of an insulating material interposed between those two electrodes, and a cap assembly 30 sealing the opening of the container 11.

The container 11 is made of conductive metal such as aluminum, an aluminum alloy, and steel plated with nickel, and it has a hexahedral shape which has the opening 11a to receive the electrode assembly 25 inside the container 11. However, it is not necessary that its shape be limited to the hexahedral shape.

The electrode assembly 25 has a jellyroll structure formed by interposing the separator 21 between the positive electrode 22 and the negative electrode 23, and winding them with respect to a core. After the electrode assembly 25 is formed into a jellyroll structure, it is pressed to form a plate type assembly.

A positive uncoated region 22a and a negative uncoated region 23a are formed opposite to each other on both ends of the electrode assembly 25. The positive uncoated region 22a and the negative uncoated region 23a are arranged to be opposite to each other since the electrode assembly 25 has a jellyroll configuration as mentioned above.

The uncoated regions 22a and 23a are regions which are left uncoated with the corresponding active materials 22c and 23c along edges of a positive collector 22b and a negative collector 23b.

The thickness (d1) of the uncoated regions 22a and 23a is less than the thickness (d2) of the electrode assembly 25 (FIG. 2).

The electrode assembly 25 is mounted inside the container 11 with the uncoated regions 22a and 23a on its left and right ends.

The cap assembly 30 includes a base plate 301 fixed to the opening 11a of the container 11 through welding to seal the container 11.

A positive terminal 31 and a negative terminal 33 are fixed to the base plate 301 while exposing a part thereof outside the container 11.

A screw thread (S) is formed on the outer circumference surface of the positive terminal 31 and the negative terminal 33, and it can be fixed to the base plate 301 by a nut 41 fastening to the screw thread (S) with a gasket 43 interposed between the base plate 301 and the nut 41.

Although not shown in the drawing, the base plate 301 can further include an electrolyte injection hole and a vent member.

A positive lead element 35 and a negative lead element 37, which are respectively in contact with and assembled with the positive uncoated region 22a and the negative uncoated region 23a, are connected to the positive terminal 31 and the negative terminal 33.

In the present embodiment, the positive and negative terminals 31 and 33 and the positive and negative lead elements 35 and 37 are formed to be symmetrical to each other.

Figure 3:
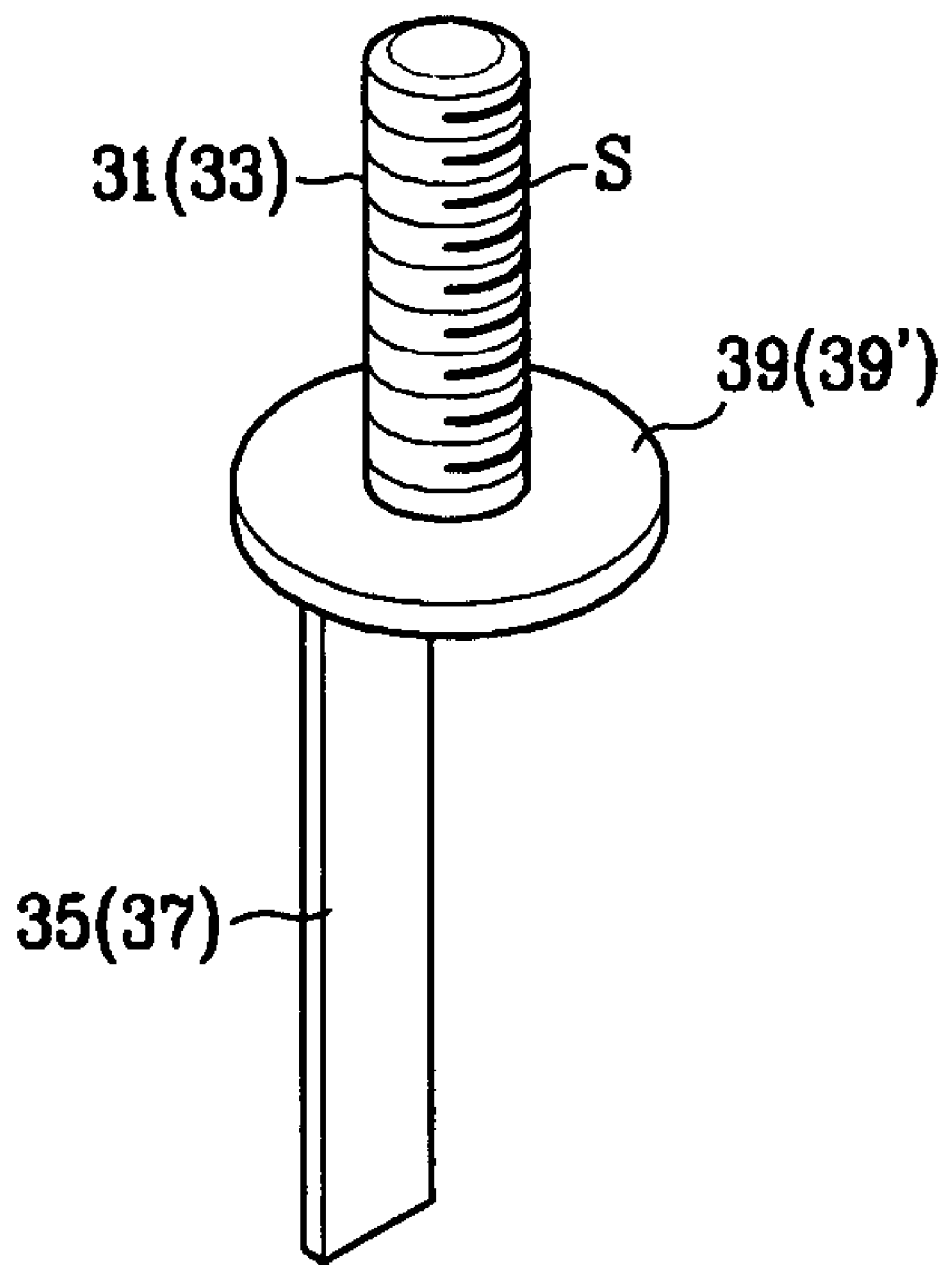
FIG. 3 is a perspective view of a terminal and a lead element according to the first embodiment of the present invention.

FIG. 3 is a perspective view of the positive and negative terminals 31 and 33 and the positive and negative lead elements 35 and 37. FIG. 3 shows the positive and negative terminals 31 and 33 and the positive and negative lead elements 35 and 37 in one drawing for convenience of drawing, and accordingly, the positive and negative terminals 31 and 33 and the positive and negative lead elements 35 and 37 will be described together as follows.

The positive terminal 31 and the negative terminal 33 have a cylindrical shape with a predetermined height, and the screw thread (S) is formed on the outer circumference surface thereof as mentioned above. The length of the terminals 31 and 33, when several secondary batteries are combined to form a battery module, are long enough to enable any connection members for electrically connecting the batteries to be fastened to the terminals 31 and 33 while the terminals 31 and 33 are positioned inside and outside the container 11.

Figure 4:
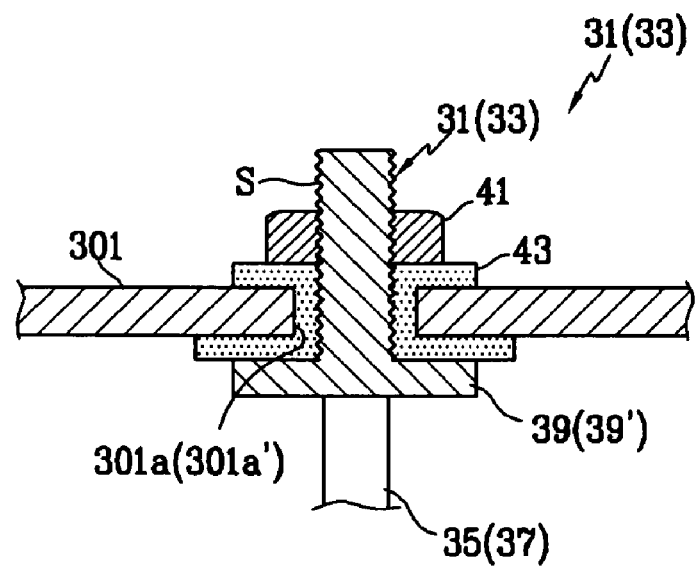
FIG. 4 is a cross-sectional view of a terminal attached to a base plate of a cap assembly according to the first embodiment of the present invention.

The positive lead element 35 and the negative lead element 37 are respectively connected to one side of the positive terminal 31 and the negative terminal 33, and disk shaped stop protrusions 39 and 39' are formed between the terminals 31 and 33 and the lead elements 35 and 37. The stop protrusions 39 and 39' stop the positive terminal 31 and the negative terminal 33 at a predetermined position of the base plate 301 by hanging them at the base plate 301 when the positive terminal 31 and the negative terminal 33 are inserted in holes 301a and 301a' (FIG. 4).

For this purpose, the stop protrusions 39 and 39' are disk shaped members with a diameter larger than the holes 301a and 301a'.

The lead elements 35 and 37 are disposed inside the container 11 and respectively contact the positive uncoated region 22a and the negative uncoated region 23a to electrically connect the terminals 31 and 33 to the electrode assembly 25. The lead elements 35 and 37 respectively closely contact the outermost portions of the positive uncoated region 22a and the negative uncoated region 23a by welding.

When the terminals 31 and 33 and the lead elements 35 and 37 with the above structure are electrically connected to the electrode assembly 25, they meet the following conditions in the present embodiment.

Figure 5:
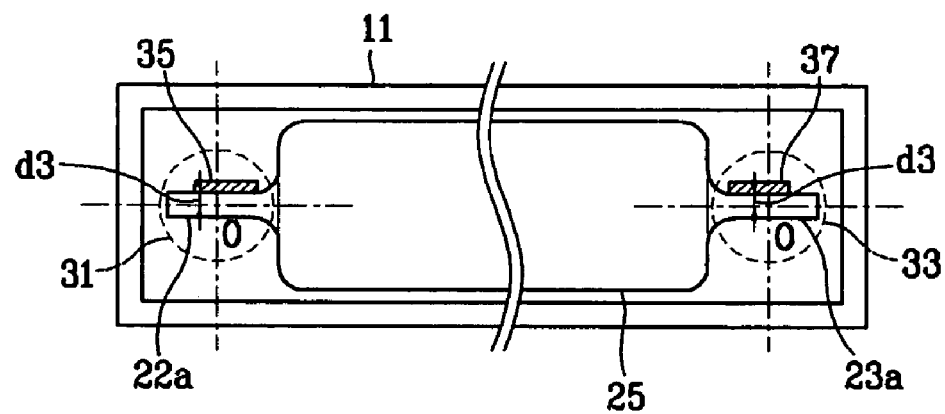
FIG. 5 is a schematic plan view of an electrode assembly mounted in a container according to the first embodiment of the present invention.

The terminals 31 and 33, as shown in FIG. 5, are arranged on the base plate 301 such that their centers are substantially aligned with the center of the electrode assembly 25, i.e. the uncoated regions 22a and 23a.

The lead elements 35 and 37 are spaced apart with a gap (d3) from the center (O) of each of the terminals 31 and 33, and one side thereof is respectively fixed to stop protrusions 39 and 39' and the other side thereof respectively closely contacts one side of the outermost portions of the positive uncoated region 22a and the negative uncoated region 23a to be fixed thereto. In the present embodiment, the terminals 31 and 33, the lead elements 35 and 37, and the stop protrusions 39 and 39' are integrally formed.

Figure 6:
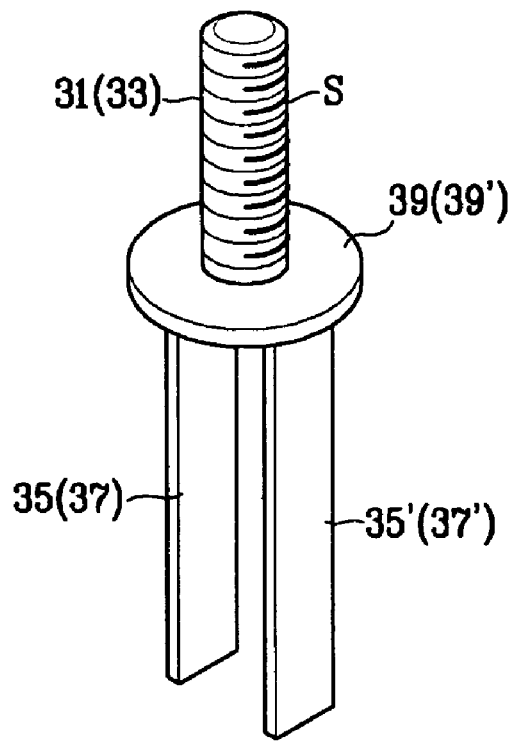
FIG. 6 is a perspective view of a terminal and a lead element according to a second embodiment of the present invention.

The lead elements 35, 37, 35' and 37', as shown in FIG. 6, can be formed in the stop protrusions 39 and 39' facing each other.

Figure 7:
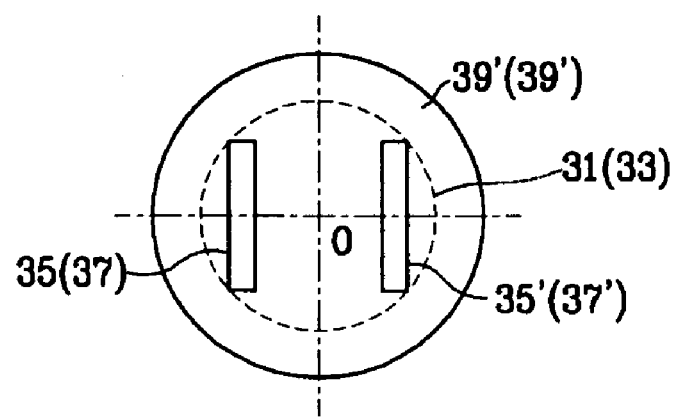
FIG. 7 is a bottom view of a terminal and a lead element according to the second embodiment of the present invention.

The lead elements 35, 37, 35' and 37', as shown in FIG. 7, are spaced apart by the gap from the center (O) of each of the terminals 31 and 33, respectively, and the lead elements 35, 37, 35' and 37' respectively closely contact both sides of the outermost portions of the positive uncoated region 22a and the negative uncoated region 23a to be fixed thereto.

If the secondary battery is manufactured through such an assembly structure of the terminals 31 and 33, the lead elements 35 and 37 and the electrode assembly 25 can pass the current from the electrode assembly 25 while arranging the lead elements 35 and 37 in the space formed around the uncoated regions 22a and 23a inside the container 11. This results in a secondary battery in which the gap formed inside the container 11 is as small as possible.

In addition, the lead elements 35 and 37 are arranged along the length direction of the uncoated regions 22a and 23a and fixed to the uncoated regions 22a and 23a by surface contact, which can reduce the contact resistance to thereby enhance the collecting efficiency.

According to the present invention, the volume of the electrode assembly disposed inside the container with a constant volume can be increased by saving empty space between the electrode assembly and the container. Accordingly, the secondary battery of the present invention can increase the energy density, and enhance the collecting efficiency to thereby function as the large battery.

Therefore, the secondary battery of the present invention can be effectively used as the power source for hybrid electric vehicles requiring high power and bulk capacity. However, its use is not limited to hybrid electric vehicles. That is, the above system can be effectively used for other motor driving battery modules for electric vehicles, motor scooters, motorbikes, or cordless vacuum cleaners, etc.

Although exemplary embodiments of the present invention have been shown and described, it would be appreciated by those skilled in the art that modifications can be made to these embodiments without departing from the principles and spirit of the present invention, the scope of which is defined by the following claims.

What is claimed is:

1. A secondary battery, comprising:
   an electrode assembly including positive and negative elements wound together with a separator therebetween and respectively including positive and negative electrodes;
   a container having one open end and adapted to receive the electrode assembly;
   a cap assembly having a base plate and at least two terminals passing through the base plate and exposed outside of the container, the cap assembly being adapted to be fixed to the one open end of the container to seal the container; and
   lead elements adapted to electrically connect the at least two terminals to the electrode assembly;
   wherein a center of each of the at least two terminals is aligned with a center of the electrode assembly, and wherein the lead elements are spaced apart from the center of their respective terminals and are adapted to be connected between their respective terminals and the electrode assembly;
   wherein the positive and negative electrodes have respective separate positive and negative uncoated regions lacking active material, the positive and negative uncoated regions being arranged on respective opposite ends of the positive and negative electrodes, respectively, and compressed together; and
   wherein the at least two terminals and the lead elements are respectively connected to the compressed positive and negative uncoated regions.

2. The secondary battery of claim 1, wherein the positive uncoated region and the negative uncoated region are adapted to be arranged opposite to each other, and wherein the lead elements are adapted to respectively attach to an outermost portion of the positive uncoated region and an outermost portion of the negative uncoated region.

3. The secondary battery of claim 1, wherein each lead element is adapted to contact and attach to its respective uncoated region along the length direction of the uncoated region.

4. The secondary battery of claim 2, wherein the outermost portions of the positive uncoated region and the negative uncoated region are adapted to be opposite to each other, and wherein the positive lead element and the negative lead element are adapted to contact and attach to at least one of the outermost portions.

5. The secondary battery of claim 1, wherein each of the at least two terminals is adapted to be inserted into a respective hole on the base plate of the cap assembly, and wherein a stop protrusion is arranged between each terminal and its respective lead element to connect the terminal to the lead element and to stop the terminal at the base plate.

6. The secondary battery of claim 5, wherein a gasket is arranged between each of the at least two terminals and the base plate and is adapted to respectively insulate each terminal from the base plate.

7. The secondary battery of claim 5, wherein a screw thread is adapted to mate with a nut arranged on an outer circumference surface of each of the at least two terminals to fix each terminal to the base plate.

8. The secondary battery of claim 1, wherein the secondary battery has a rectangular shape.

9. A secondary battery, comprising:
   an electrode assembly including positive and negative elements wound together with a separator therebetween and respectively including positive and negative electrodes;
   a container having one open end and adapted to receive the electrode assembly;
   a cap assembly having a base plate and at least two terminals passing through the base plate and exposed outside of the container, the cap assembly being adapted to be fixed to the one open end of the container to seal the container; and
   lead elements adapted to electrically connect the at least two terminals to the electrode assembly;
   wherein a center of each of the at least two terminals is aligned with a center of the electrode assembly, and wherein the lead elements are spaced apart from the center of their respective terminals and are adapted to be connected between their respective terminals and the electrode assembly;
   wherein the positive and negative electrodes have respective separate positive and negative uncoated regions lacking active material, and wherein the positive uncoated region and the negative uncoated region are adapted to be arranged opposite to each other, and wherein the lead elements are adapted to respectively attach to an outermost portion of the positive uncoated region and an outermost portion of the negative uncoated region.

10. The secondary battery of claim 9, wherein the outermost portions of the positive uncoated region and the negative uncoated region are adapted to be opposite to each other, and wherein the positive lead element and the negative lead element are adapted to contact and attach to at least one of the outermost portions.

11. The secondary battery of claim 9, wherein each of the at least two terminals is adapted to be inserted into a respective hole on the base plate of the cap assembly, and wherein a stop protrusion is arranged between each terminal and its respective lead element to connect the terminal to the lead element and to stop the terminal at the base plate.

12. The secondary battery of claim 11, wherein a gasket is arranged between each of the at least two terminals and the base plate and is adapted to respectively insulate each terminal from the base plate.

13. The secondary battery of claim 11, wherein a screw thread is adapted to mate with a nut arranged on an outer circumference surface of each of the at least two terminals to fix each terminal to the base plate.

14. A secondary battery, comprising:
an electrode assembly including positive and negative elements wound together with a separator therebetween and respectively including positive and negative electrodes;
a container having one open end and adapted to receive the electrode assembly;
a cap assembly having a base plate and at least two terminals passing through the base plate and exposed outside of the container, the cap assembly being adapted to be fixed to the one open end of the container to seal the container; and
lead elements adapted to electrically connect the at least two terminals to the electrode assembly;
wherein a center of each of the at least two terminals is aligned with a center of the electrode assembly, and wherein the lead elements are spaced apart from the center of their respective terminals and are adapted to be connected between their respective terminals and the electrode assembly;
wherein the positive and negative electrodes have respective separate positive and negative uncoated regions lacking active material, and wherein each lead element is adapted to contact and attach to its respective uncoated region along the length direction of the uncoated region.

15. The secondary battery of claim 14, wherein the outermost portions of the positive uncoated region and the negative uncoated region are adapted to be opposite to each other, and wherein the positive lead element and the negative lead element are adapted to contact and attach to at least one of the outermost portions.

16. The secondary battery of claim 14, wherein each of the at least two terminals is adapted to be inserted into a respective hole on the base plate of the cap assembly, and wherein a stop protrusion is arranged between each terminal and its respective lead element to connect the terminal to the lead element and to stop the terminal at the base plate.

17. The secondary battery of claim 16, wherein a gasket is arranged between each of the at least two terminals and the base plate and is adapted to respectively insulate each terminal from the base plate.

18. The secondary battery of claim 16, wherein a screw thread is adapted to mate with a nut arranged on an outer circumference surface of each of the at least two terminals to fix each terminal to the base plate.

* * * * *